ically predictable and controllable release properties toward normally tacky and pressure-sensitive adhesive sheet materials is prepared by reacting two moieties, one terminated with a plurality of isocyanate groups and the other a liquid hydroxyl- or amine-containing organosilicone.

United States Patent [19]

Schurb et al.

[11] 3,997,702
[45] Dec. 14, 1976

[54] STRATUM HAVING RELEASE PROPERTIES AND METHOD OF MAKING

[75] Inventors: Frank A. Schurb; Jack L. Evans, both of St. Paul, Minn.

[73] Assignee: Minnesota Mining and Manufacturing Company, St. Paul, Minn.

[22] Filed: Aug. 13, 1975

[21] Appl. No.: 604,327

Related U.S. Application Data

[62] Division of Ser. No. 423,706, Dec. 11, 1976, Pat. No. 3,957,724.

[52] U.S. Cl. .............................. 428/352; 427/387; 428/354; 428/423; 428/425; 428/447
[51] Int. Cl.² ...................... C09J 7/02; B05D 3/02
[58] Field of Search .......... 428/352, 354, 423, 425, 428/447, 448; 427/387; 260/46.5 E, 77.5 AP, 77.5 AQ, 824–826

[56] References Cited

UNITED STATES PATENTS

| 3,178,391 | 4/1965 | Holtschmidt et al. | 260/46.5 |
|---|---|---|---|
| 3,179,622 | 4/1965 | Haluska | 260/46.5 |
| 3,246,048 | 4/1966 | Haluska | 260/824 |
| 3,503,782 | 3/1970 | Ayres | 428/447 X |
| 3,565,750 | 2/1971 | Evans | 428/447 X |
| 3,632,557 | 1/1972 | Brode et al. | 260/77.5 |
| 3,690,924 | 9/1972 | Estes | 428/352 |
| 3,749,593 | 7/1973 | Keiser | 428/447 X |

Primary Examiner—P.E. Willis, Jr.
Attorney, Agent, or Firm—Alexander, Sell, Steldt & DeLaHunt

[57] ABSTRACT

A stratum having accurately predictable and controllable release properties toward normally tacky and pressure-sensitive adhesive sheet materials is prepared by reacting two moieties, one terminated with a plurality of isocyanate groups and the other a liquid hydroxyl- or amine-containing organosilicone. The hydroxyl or amine groups are at least three carbon atoms distant from the nearest silicon atom and constitute no more than about 4% by weight of the organosilicone. Depending upon the release characteristics achieved, the reaction product can function as a shaped article, all or part of a release liner, or as a low-adhesion backsize for pressure-sensitive adhesive tape.

9 Claims, No Drawings

STRATUM HAVING RELEASE PROPERTIES AND METHOD OF MAKING

CROSS-REFERENCE TO RELATED APPLICATION

This application is a division of copending application Ser. No. 423,706, filed Dec. 11, 1973, now U.S. Pat. No. 3,957,724.

BACKGROUND OF THE INVENTION

This invention relates to polymers which exhibit release properties toward a wide variety of normally tacky and pressure-sensitive adhesive sheet materials.

For many years manufacturers of inherently tacky mastics or adhesives have protected the compositions with such anti-stick, or "abhesive" material as wax-coated paper, plastic films, plastic-coated paper, starch-impregnated fabrics, and extremely complex polymer systems. The last-named type of polymer has found particular application as a coating on the back surface of normally tacky and pressure-sensitive adhesive tape wound in roll form, where it functions as a so-called low adhesion backsize (LAB), facilitating use of the tape and preventing inadvertent transfer of the adhesive to the back surface. The force to separate the tape from an LAB coating typically ranges from 150 to 900 grams per inch of width, lower values generally causing roll instability and handling problems, and higher values making it excessively difficult to use the tape. For exemplary polymeric low adhesion backsizes, see U.S. Pat. Nos. 2,532,011, 2,607,711, 2,876,894, 3,318,852, and 3,342,625.

For some products, e.g., labels or large adhesive-coated sheets sold in other than roll form, it is desirable to have a protective release liner to which normally tacky and pressure-sensitive adhesives adhere very weakly; U.S. Pat. Nos. 3,230,289, 3,565,750, and 3,729,444 are illustrative of such products, all of which are based on a silicone coating of some type. The force to separate a pressure-sensitive adhesive from a silicone-treated surface is typically in the range of 10 to 40 grams per inch of width, usually much too low for use as a low adhesion backsize. Generally speaking, it has previously been almost impossible to obtain materials having release properties intermediate those of the LAB-type polymers and those of the silicones without sacrificing some other essential property.

Recognizing the desirability of a release coating having properties intermediate the 40 grams per inch shown by the extremely expensive silicones and the 600 grams per inch shown by more modestly priced typical low adhesion backsizes, attempts have been made to modify the silicone polymers by blending or reacting them with other less effective release materials; see, e.g., U.S. Pat. Nos. 3,328,482, 3,723,566, and 3,770,687. Some of the resultant modifications so contaminate a pressure-sensitive adhesive that it loses its tack, while others gradually react with a pressure-sensitive adhesive in such a manner that they cannot be separated after aging. Other compositions are difficult to reproduce with consistency, exhibit changed release properties as the silicone gradually migrates to the surface, require cure temperatures so high that they adversely affect the substrate on which they are coated, or are effective only with a few specific adhesives.

SUMMARY OF THE INVENTION

The present invention provides, for the first time, it is believed, a family of products which provide controllable release, or "abhesive" properties over the range represented by silicone polymers at the low end and conventional low adhesion backsizes at the high end.

Products made in accordance with the invention are solid, crosslinked, substantially insoluble, joined interpenetrating polymeric network reaction products of starting materials consisting essentially of (1) an isocyanate-terminated moiety and (2) an active hydrogen-containing organosilicone moiety. The first moiety, which is liquid at 60° C. (and generally at 20° C.), is terminated with from more than 1 to less than 3 isocyanate groups, has an NCO equivalent weight of at least about 100, and contains no more than 5 urea or urethane gram equivalents per 1000 grams. Preferably the NCo groups are attached to aromatic rings. The second moiety, which is liquid at 20° C., has a plurality of active hydrogen atoms each chemically bonded to a nitrogen or oxygen atom which is at least three carbon atoms distant from the nearest silicon atom, the said oxygen or nitrogen atoms constituting no more than about 4% by weight of the organosilicone moiety. Preferably this moiety is predominantly polydimethyl siloxane.

The stratum of release material made in accordance with the invention may be considered as a solid, crosslinked, substantially insoluble polymeric composition of matter consisting essentially of a product having the general formula

wherein

X is the residue of a polyisocyanate having an NCO equivalent weight of at least about 100 and containing not more than 5 urethane or urea gram equivalents per 1000 grams, Y is the residue of a liquid organosilicone having a plurality of active hydrogen atoms each bonded to a nitrogen or oxygen atom which is at least 3 carbon atoms distant from the nearest silicon atom, said nitrogen or oxygen atoms constituting no more than about 4% of the organosilicone, $m$, $n$ and $p$ are integers, the ratio of $n:m$ is no more than about 1.6:1, and $p$ is sufficiently great to cause said composition to be a solid.

The crosslinked reaction product can, in certain circumstances, be employed as a completely self-supporting release sheet material, in which capacity it functions as a unique and comparatively inexpensive replacement for the costly perfluoroolefin polymer films sometimes used for this purpose, exhibiting excellent tensile strength, tear resistance, heat resistance and solvent resistance; silicone polymers lack the strength, hardness, etc., to be used for this purpose without some type of support. Sleeves, roll covers, and other shaped articles having release surfaces can be prepared. The product can similarly be employed as a release liner if coated on one or both surfaces of paper, polymeric film, or similar substrates. Because of the ease in varying the release properties as desired, the invention permits coating two related but different compositions on opposite sides of a supporting sheet, thereby providing a liner having differential release properties. In other forms, the polymeric reaction product can be employed as an LAB for pressure-sensitive adhesive tape products, the specific release properties being readily tailored to the value desired for the specific tape.

The reaction product is conveniently obtained by blending together in a mutual solvent 98 to 50 parts by weight of the isocyanate-terminated moiety, 2–50 parts by weight of the previously described active hydrogen-containing liquid organosilicone moiety, and optionally a crosslinking agent such as a phenol-formaldehyde resin, coating the resultant pourable liquid in a thin layer, or stratum, upon a substrate, drying to remove the solvent, and, generally, heating the stratum to react the moieties. The weights of the organosilicone and isocyanate moieties are so selected that the mol ratio of the former to the latter is no more than about 1.6:1, the exact ratio being dependent upon the molecular weights of the two moieties, the presence or absence of a crosslinking agent, the hardness or release values desired, etc.

Typically the isocyanate-terminated moiety is prepared by the conventional process of reacting a stoichiometric excess of one or more polyisocyanates with one or more diols, triols, diamines or triamines, thereby forming a prepolymer. Assuming all other factors are held constant, decreasing the molecular weight of the original polyol or polyamine increases the hardness of the ultimate product attained upon reaction with the organosilicone. Exemplary polyols include polyoxyethylene glycol, polyoxypropylene glycol, OH-terminated polyesters, 1,4-butane diol, 1,10-decane diol, OH-terminated polybutadiene, OH-terminated butadiene:acrylonitrile copolymers. OH-terminated butadiene:styrene copolymers, polytetramethylene ether diol, glycerol, trimethylol propane, castor oil, etc. Exemplary polyamines include ethylene diamine, diethylene triamine, hexamethylene diamine, polytetramethylene ether diamine, polyoxypropylene diamine, amine-terminated polyesters, etc. Because of lower cost, greater availability and superior ease of handling, the polyols are generally preferred.

Typical polyisocyanates for the preparation of prepolymers include tolylene diisocyanate, methylene bis(4-phenyl isocyanate), and poly(phenylmethylene)-triisocyanate, although others may be chosen for specific purposes.

Preferably the active hydrogen-containing silicone moiety is a silane-modified polysiloxane. In preparing such moieties, linear polysiloxane fluids, dimethyl- or predominantly dimethyl-substituted and further characterized by being hydroxyl-endblocked, are reacted with silanes of the general formula

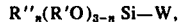

where $n$ is 0, 1 or 2, R'' is a monovalent hydrocarbon radical containing from 1 to 6 carbon atoms, R' is an alkyl radical containing from 1 to 4 carbon atoms and W is an aliphatic monovalent radical containing primary and/or secondary amine groups, or carbinol groups. A preferred silane modifier is $(CH_3O)_3$-$Si(CH_2)_3NH(CH_2)_2NH_2$, commercially available from Dow Corning Corporation under the trade designation "Z-6020". Also useful are silane-modified polysiloxanes such as that commercially available from Dow Corning Corporation under the trade designation DC-531; such products are also discussed in U.S. Pat. No. 3,508,933, as an additive for automobile polish. The silane modification reaction is carried out in hydrocarbon solvents at slightly elevated temperatures in a system free of moisture.

DESCRIPTION OF PRESENTLY PREFERRED EMBODIMENTS

Throughout the remainder of the specification, all parts and percentages are by weight unless otherwise noted.

In accordance with the invention, an isocyanate-terminated prepolymer is prepared as follows: Into a round bottom flask equipped with a motor-driven stirrer, reflux condenser, thermometer, and nitrogen gas inlet, there is introduced sufficient polyol to provide 0.05 hydroxyl equivalent. Next there is introduced sufficient methyl ethyl ketone solvent so that the total ultimate charge to the flask will contain 10% solids and 90% solvent. The stirrer is then turned on, sufficient polyisocyanate added to provide 0.1 NCO equivalent, and the solution brought to reflux temperature (typically 80° C.) under a nitrogen purge. A 5% solution of lead octoate catalyst in methyl ethyl ketone is then added, approximately 0.1 gram catalyst per 100 grams of polyol plus isocyanate being employed. The reaction is then allowed to proceed at reflux under nitrogen purge for 3 hours, at the end of which time it is allowed to cool ambiently to room temperature and removed to a sealed storage vessel.

Sheet material having release properties is prepared in accordance with the invention as follows: Into a round bottom flask equipped with a motor driven stirrer and a nitrogen gas inlet is charged a sufficient quantity of the prepolymer prepared according to the preceding paragraph to provide the desired number of equivalents of NCO. The stirrer is then turned on and, with the flask under a nitrogen purge, a sufficient quantity of a 10% solution of a suitable amine- or hydroxyl-containing silicone is added to provide the desired number of amine or hydroxyl equivalents. The reaction is then allowed to proceed for a predetermined time (typically from 1 to 24 hours), at the end of which time the product is removed from the reaction vessel and either stored in a sealed container until needed or coated directly upon a desired substrate. After coating, the solvent is then evaporated and the substrate optionally heated to react the isocyanate and amine or hydroxyl groups.

Although the mechanism of the reaction between the NCO-terminated moiety and the active hydrogen-containing silicone moiety is not fully understood, the complex polymeric reaction product which is formed contains new types of functionality, including urea, biuret and allophanic ester groups, while "locking in" the silicone segments with the residue of the isocyanate-terminated moiety. The reaction product is properly classified as a "joined interpenetrating polymer network" as opposed to a block copolymer; cf. Sperling, ACS Polymer Preprints, Vol. 14(2), August, 1973. (In this regard, attention is further directed to U.S. Pat. No. 3,705,823, which describes fibrous structures coated with the block copolymer reaction product of certain polyurethane prepolymers and certain polyorganosiloxanes.) If desired, a polyfunctional crosslinking agent such as N,N,N',N'-tetra(2-hydroxypropyl- )ethylene diamine or a phenol-formaldehyde resin may be introduced into the reaction mixture to impart greater hardness or further reduce adhesion of pressure-sensitive adhesives to the surface of the reaction product.

The exact coating technique is not especially critical, and any of several well known procedures may be followed. It has been found, however, that a rotogravure applicator roll having 200 lines per inch provides a uniform and effective means of applying a 10% solution of the isocyanate-terminated prepolymer and active hydrogen-containing silicone. Wire-wound rods, such as a Mayer bar, are likewise effective for this purpose.

Certain tests have been found helpful in evaluating the effectiveness of release liners or low adhesion backsize coatings. For convenience, these tests and their significance are described in subsequent paragraphs.

Release

A strip of the test tape 1 inch wide × 10 inches long is applied to a strip of sheet material (prepared in accordance with the invention) 1½inches wide × 10 inches long and rolled down with one pass of a 4½-pound rubber-covered roller. One end of this liner-tape composite is attached, by means of a clamp and hook arrangement, to a point on the lower periphery of a horizontal, three-inch diameter aluminum cylinder which is located in an oven. The liner-tape composite is then looped over the cylinder, tape-side out, and a 500 gram weight attached to to the other end. While thus under stress, the composite is then aged for 16 hours at 150° F.[1], after which it is removed to a 72° F., 50% relative humidity environment for about 2 hours. "Stripback" adhesion value is then obtained by wrapping the composite tape-side out, around a 3-inch diameter free-turning spindle, and stripping the tape away from the liner at a 90° angle at 90 inches per minute while measuring the stripping force in grams or ounces per inch of width.

[1] Believed to correspond to 6-12 months of aging under normal conditions.

An effective release liner should provide a stripping force of no more than 150 grams per inch of width, even with extremely aggressive adhesives. Preferably this value should not exceed 100 grams per inch, and for many adhesives it will be less than 30 grams per inch. These values are particularly important in the case of wide strips of easily stretchable tape, which may otherwise become badly distorted during removal from the liner. For a low adhesion backsize release coating, the release value in accordance with this test should be in the range of 150–900 grams per inch of width.

Adhesion loss

To determine whether the liner deleteriously affects the adhesive, a strip of tape, aged as described above, is removed from the liner, applied to a clean glass surface, rolled down with one pass of a 4-½-pound rubber roller, and stripped from the glass at a 180° angle at 90 inches per minute while measuring the adhesion value in ounces. This value is compared to that obtained using as a control the same tape which has been kept out of contact with the liner. Assuming that the adhesive is not adversely affected by heat alone, the adhesion to glass after aging should be at least 80% of the control. If part of the liner's adhesive-contacting surface transfers to or reacts with the adhesive, this percentage will be significantly lower.

Unwind force

A roll of tape ½ inch wide is mounted so as to be freely rotatable about a shaft which in turn is mounted on a bracket attached to a movable carriage. The free end of the tape is gripped between the jaws of a device capable of recording tensile force, and the carriage is then moved away from the jaws at the rate of 90 inches per minute. The unwind force is noted and reported as either ounces or grams per inch of width. An effective low adhesion backsize coating will permit the tape to be unwound with a force of at least about 150 grams per inch of width but generally not more than about 900 grams per inch of width.

Subsequently appearing Tables I and II show products made by preparing isocyanate-terminated prepolymers (or directly using isocyanate-terminated moieties), mixing them with amine-or hydroxyl-containing silicones (and optionally phenolaldehyde resin cross-linking agent), coating the mixture on a 2-mil biaxially oriented polyethylene terephthalate film, heating to react the various components, and thereafter measuring the characteristics of the surface of the cured reaction product when placed in contact with tapes having two different types of normally tacky and pressure-sensitive adhesives*. Preparation and testing procedures were as previously described. In the examples, the following abbreviations are employed:

* The "acrylate" adhesive was a 95.5:4.5 isooctyl acrylate: acrylic acid copolymer; cf. U.S. Pat. No. Re. 24,906. The "rubber-resin" adhesive was formulated from 100 parts milled pale crepe rubber, 10 parts zinc resinate resin derived from wood resin, 40 parts neutral polyterpene tackifier resin having a 115° C. softening point, 6 parts heat-advancing oil-soluble phenolaldehyde resin, 5 parts tricresyl phosphate, and 1 part rubber antioxidant.

| Prepolymer polyol bases | |
|---|---|
| 1,4 | 1,4-butanediol |
| 1,10 | 1,10-decanediol |
| ACN | OH-terminated butadiene:acrylonitrile copolymer having an average molecular weight of 2400, available from Sinclair-Koppers Co. under the trade designation "Poly B-D CN-15" |
| PD | OH-terminated polybutadiene resin having an average molecular weight of 3200, available from Sinclair-Koppers Co. under the trade designation "Poly B-D R-15M" |
| CAB | Alcohol-soluble cellulose acetate butyrate resin containing an average of 47% butyryl, 1.6% acetyl, and 4–5% hydroxyl |
| CAST | Castor oil |
| DANT | Di(2-hydroxyethyl)dimethylhydantoin, commercially available from Glyco Chemicals, Inc. under the trade designation "Dantocol" |
| P 52 | Poly bis-hydroxy ethyl azelate, commercially available from Emery Industries, Inc. under the trade designation "Polyester 3752-D" |
| PCLD | Polycaprolactone diol, having an average formula molecular weight of 530, commercially available from Union Carbide Corporation under the trade designation "Niax Polyol D-510" |
| PG 200 | Tris(hydroxypropyl) glycerine, commercially available from The Dow Chemical Company under the trade designation "Voranol CP-260" |
| PG 400 | Polyoxypropylene glycol having an OH number of about 265, commercially available from Union Carbide Corporation under the trade designation "PPG-425" |
| PG 500 | Polyoxypropylene glycol having an average molecular weight of about 490, commercially available from Union Carbide Corporation under the trade designation "LS-490" |
| PG 700 | Polyoxypropylene glycol having an average molecular weight of about 775, commercially available from |

| | |
|---|---|
| PG 2000 | Wyandotte Chemical Corporation under the trade designation "Pluracol P 710" Polyoxypropylene glycol having an average molecular weight of about 2000, commercially available from Union Carbide Corporation under the trade designation "PPG-2025" |
| PG 4000 | Polyoxypropylene glycol having an average molecular weight of about 4200, commercially available from Union Carbide Corporation under the trade designation "LHT-42" |
| Isocyanates | |
| PAPI | Polymethylene polyphenyl isocyanate, commercially available from Upjohn Company under the trade designation "PAPI 901" |
| ISO | Similar to "PAPI," commercially available from Upjohn Company under the trade designation "Isonate 390-P" |
| MRS | Similar to "PAPI," commercially available from Mobay Chemical Company under the trade designation "Mondur MRS" |
| TDI | Tolylene diisocyanate |
| Crosslinking agent | |
| Phen | Heat-advancing, oil soluble phenol-aldehyde resin, commercially available from Union Carbide Corporation under the trade designation "CKR 1634" |
| Silicones | |
| A | Polydimethyl siloxane having both primary and secondary amine groups on pendent side chains, at least 3 carbon atoms removed from the nearest silicon atom, commercially available from Dow Corning Corporation under the trade designation "DC-531" |
| B | Polydimethyl siloxane having secondary amine groups on pendent side chains, at least 3 carbon atoms removed from the nearest silicon atom, commercially available from Dow Corning Corporation under the trade designation "XF-3655" |
| C | Polydimethyl siloxane similar to "A," commercially available from Dow Corning Corporation under the trade designation "XF-3656" |
| D | Polydimethyl siloxane with pendent primary amine groups [—$(CH_2)_4NH_2$], commercially available from Union Carbide Corporation under the trade designation "Y-6165" |
| E | Polydimethyl siloxane similar to "D," commercially available from Union Carbide Corporation under the trade designation "Y-5477" |
| F | Reaction product of 94 mols dimethyl siloxane and 6 mols methyl phenyl siloxane, having an OH equivalent value of 18,000 |
| G | Reaction product of 10 parts "F" and 1 part N-β-aminoethyl)-γ-aminopropyl trimethoxysilane |
| H | Reaction product of 10 parts "F" and 1 part $(CH_3O)_3Si(CH_2)_3NH(CH_2)_2NH(CH_2)_2OCOCH_3$ |

TABLE I

| | Polyurethane prepolymer | | | Silicone | | Parts phenolic Crosslinker |
|---|---|---|---|---|---|---|
| Example | Base | Isocyanate | Parts | Type | Parts | |
| 1 | 1,4 | PAPI | 97.7 | A | 2.3 | 32 |
| 2 | " | " | 83.3 | " | 16.7 | 16.7 |
| 3 | " | " | 62.5 | " | 37.5 | 7.5 |
| 4 | " | " | 25.0 | " | 75.0 | 5 |
| 5 | & BD | " | 82.6 | " | 17.4 | 17.4 |
| 6 | ACN | " | " | " | " | " |
| 7 | PG 4000 | " | 81.8 | " | 18.2 | 6.7 |
| 8 | DANT | " | 75.0 | " | 25.0 | 12.5 |
| 9 | PG 400 | " | 66.7 | " | 33.3 | 33.3 |
| 10 | P 52 | " | 50.0 | " | 50.0 | 10.0 |
| 11 | — | ISO | 5.0 | " | 95.0 | 0 |
| 12 | & CAB | TDI | 83.3 | " | 16.7 | 0 |
| 13 | CAST | " | 50.0 | " | 50.0 | 25.0 |
| 14 | 1,10- | MRS | 63.7 | " | 36.3 | 9.1 |
| 15 | 1,4- | PAPI | 75.6 | B | 24.4 | 12.2 |
| 16 | " | " | " | C | " | " |
| 17 | " | " | 72.2 | D | 27.8 | 13.9 |
| 18 | " | TDI | 80.0 | E | 20.0 | 20.0 |
| 19 | & P 52 | PAPI | 66.7 | G | 33.3 | 0 |
| 20 | " | " | 33.3 | H | 66.7 | 0 |

TABLE II

| | Release gms/in | | Adhesion to glass after heat aging, oz/in. | | Satisfactory for | |
|---|---|---|---|---|---|---|
| Example | Acrylic adhesive | Rubber-resin adhesive | Acrylic adhesive | Rubber-resin adhesive | LAB? | Liner? |
| 1 | 570 | 740 | 48 | 84 | Yes | No |
| 2 | 30 | 140 | 44 | 70 | No | Yes |
| 3 | 30 | 160 | 42 | 68 | No | Yes |
| 4 | 160 | 220 | 50 | 88 | Yes | Some adhesives |
| 5 | 100 | 100 | 44 | 49 | No | Yes |
| 6 | 80 | 210 | 53 | 57 | Some adhesives | Some adhesives |
| 7 | 250 | 1140 | 40 | 52 | Some adhesives | Some adhesives |
| 8 | 30 | 140 | 44 | 69 | No | Yes |
| 9 | 30 | 60 | 52 | 48 | No | Yes |
| 10 | 30 | 140 | 40 | 49 | Some adhesives | Yes |
| 11 | 140 | 180 | 42 | 71 | Some adhesives | Marginal |
| 12 | 220 | 140 | 43 | 52 | Yes | Some adhesives |
| 13 | 30 | 160 | 50 | 48 | Yes | No |
| 14 | 50 | 80 | 49 | 73 | No | Yes |
| 15 | 500 | 720 | 48 | 45 | Yes | No |
| 16 | 140 | 200 | 54 | 74 | Yes | No |
| 17 | 140 | 390 | 50 | 84 | Yes | No |
| 18 | 140 | 320 | 48 | 60 | Yes | No |
| 19 | 100 | 150 | 41 | 76 | Some adhesives | Yes |
| 20 | 20 | 70 | 44 | 64 | No | Yes |

Examples 21–31 tabulated in Tables III and IV below, show the preparation of tape products having a low adhesion backsize in accordance with the invention. In preparing both the prepolymer and the final polymer, the equivalent weight of each reactant was precisely determined by titration. Preparation techniques were essentially the same as in previous examples. The tape backing to which the low adhesion backsize coatings were applied was one-mil biaxially oriented polyethylene terephthalate. Thereafter, the other side of the backing was coated with two different normally tacky and pressure-sensitive adhesives, an "acrylate adhesive" and a "rubber-resin adhesive". The former was a 96:4 isooctyl acrylate: acrylamide copolymer, as described in U.S. Pat. No. Re. 24,906. The latter was formulated from 100 parts milled pale crepe rubber tackified with 75 parts of polymerized b-pinene having a softening temperature of 115° C., and containing an alkylated phenol antioxidant. Figures reported in Table IV are the average for three rolls of tape taken from the left, right and center of a wide roll.

TABLE III

| | NCO-terminated prepolymer | | | | Final polymer | | | |
|---|---|---|---|---|---|---|---|---|
| Example | Equivalents 1,4-butane-diol | Equivalents PG 700 | Equivalents PG 2000 | Equivalents polyisocyanate | NCO equivalent wt. | Parts NCO-terminated prepolymer | Parts Silicone "A" | NCO:NH₂ mol ratio | Reaction time, hours |
| 21 | 20 | 80 | — | 200 | 776 | 75.4 | 24.6 | 11:1 | 1 |
| 22 | 50 | 50 | — | " | " | 75.2 | 24.8 | 11:1 | 1 |
| 23 | " | " | — | " | 526 | 64.4 | 35.6 | 9:1 | 1 |
| 24 | " | " | — | " | " | " | " | " | 24 |
| 25 | " | " | — | " | " | 48.5 | 51.5 | 5:1 | 1 |
| 26 | " | " | — | " | " | " | " | " | 24 |
| 27 | 80 | 20 | — | " | 857 | 77.2 | 22.8 | 11:1 | 1 |
| 28 | — | — | 100 | " | 4390 | 57.5 | 42.5 | 4:1 | 1 |
| 29 | — | — | " | " | " | 64.9 | 35.1 | 11:1 | 1 |
| 30 | 50 | — | 50 | " | 704 | 52.0 | 48.0 | 4:1 | 1 |
| 31 | " | — | " | " | " | 74.8 | 25.2 | 11:1 | 1 |

TABLE IV

| | Acrylate adhesive | | | | Rubber-resin adhesive | | | |
|---|---|---|---|---|---|---|---|---|
| | Unwind force, grams/inch | | Adhesion to glass, oz./inch | | Unwind force, grams/inch | | Adhesion to glass, oz./inch | |
| Example | Initial | After aging | Initial | After aging | Initial | After aging | Initial | After aging |
| 21 | 60 | 310 | 54 | 58 | 60 | 310 | 54 | 62 |
| 22 | " | 60 | 54 | 62 | 60 | 170 | 58 | 60 |
| 23 | " | 310 | 42 | 50 | 170 | 280 | 46 | 48 |
| 24 | " | 60 | 46 | 48 | 170 | 510 | 54 | 58 |
| 25 | " | " | 42 | 50 | 170 | 280 | 50 | 54 |
| 26 | " | " | 50 | 46 | 170 | 480 | 50 | 58 |
| 27 | 570 | split | 52 | split | 280 | 960 | 55 | 54 |
| 28 | 60 | 60 | 58 | 50 | 170 | 170 | 66 | 62 |
| 29 | " | " | 62 | 60 | 280 | 280 | 62 | 66 |
| 30 | " | " | 58 | 54 | 170 | 280 | 62 | 66 |
| 31 | " | " | 62 | 58 | 280 | 280 | 62 | 62 |

While the products of previous examples were inherently capable of being formed into self-supporting strata for use as heat-resistant release liners, the next two examples expressly disclose the preparation of self-supporting films of this type. In each case, an isocyanate-terminated prepolymer was prepared by reacting a stoichiometric excess of TDI with PCLD diol. Next 30.0 parts of the prepolymer (50% solids in methyl ethyl ketone) 20.0 parts of phenolic resin crosslinker and 5.0 parts PG 500 (the latter two as 50% solids solution in xylene) were reacted for either one hour (Example 32) or twenty hours (Example 33).

In both Example 32 and 33, 88.2 parts of the appropriate reaction product solution (see preceding paragraph) was mixed with 11.8 parts silicone A solution. Films were then cast by pouring a thin layer of the mixed solutions into a Teflon perfluoroolefin-lined flat-bottom pan, and the solvent allowed to evaporate overnight at room temperature and the remaining solid materials heated in an oven at 300° F. (about 150° C) for 5 minutes. The film, approximately 10 mils (250 microns) thick in each case, was then removed from the pan and subjected to various physical tests, with the results tabulated below:

TABLE V

| | | | Release, gms/in. width | |
|---|---|---|---|---|
| Example | Tensile strength, psi | % elongation at break | Acrylic adhesive | Rubber-resin adhesive |
| 32 | 4266 | 1.3 | 32 | 44 |
| 33 | 1134 | 75.8 | 87 | 40 |

It will be appreciated that the foregoing description does not purport to cover all the ramifications of this invention. Using the principles disclosed, however, those skilled in the art will be able to modify, adapt and employ the invention to fit specific situations.

What is claimed is as follows:

1. A pressure-sensitive adhesive tape in which a sheet backing is provided, on one surface, with a layer of normally tacky and pressure-sensitive adhesive and on the other surface with a low adhesion backsize which is
   the solid, crosslinked, substantially insoluble joined interpenetrating polymeric network reaction product of starting materials consisting essentially of
   (1) 98–50 parts by weight of a first moiety terminated with from more than 1 to not more than 3 isocyanate groups, liquid at 60° C., having an NCO equivalent weight of at least about 100, containing not more than 5 urethane or urea gram equivalents per 1000 grams of said moiety, and formed by reacting one or more polyisocyanates with one or more diols, triols, diamines or triamines, and (2) correspondingly 2–50 parts by weight of an organosilicone second moiety which is a silane-modified OH-endblocked predominantly dimethyl-substituted linear polysiloxane, is liquid at 20° C., and has a plurality of active hydrogen atoms each chemically bonded to a nitrogen or oxygen atom attached to a CH₂ group which is at least 3 carbon atoms distant from the nearest silicon atom, said nitrogen or oxygen atoms constituting no more than about 4% by weight of said organosilicone moiety.

2. A removable release liner in which a sheet backing is provided, on at least one surface, with a thin release layer which is
   the solid, crosslinked, substantially insoluble joined interpenetrating polymeric network reaction product of starting materials consisting essentially of
   (1) 98–50 parts by weight of a first moiety terminated with from more than 1 to not more than 3 isocyanate groups, liquid at 60° C., having an NCO equivalent weight of at least about 100, containing not more than 5 urethane or urea gram equivalents per 1000 grams of said moiety, and formed by reacting one or more polyisocyanates with one or more diols, triols, diamines or triamines, and (2) correspondingly 2–50 parts by weight of an organosilicone second moiety which is a silane-modified OH-endblocked predominantly dimethyl-substituted linear polysiloxane, is liquid at 20° C., and has a plurality of active hydrogen atoms each chemically bonded to a nitrogen or oxygen atom attached to a $CH_2$ group which is at least 3 carbon atoms distant from the nearest silicon atom, said nitrogen or oxygen atoms constituting no more than about 4% by weight of said organosilicone moiety.

3. The liner of claim 2 wherein each of the two surfaces of the sheet backing is provided with a thin release layer, the two layers exhibiting different release properties.

4. The method of making a self-supporting sheet material capable of being wound convolutely upon itself in roll form, said sheet material affording accurately predictable and controllable release for a wide variety of normally tacky and pressure-sensitive adhesives, which method includes the steps of:
a. blending together in a mutually compatible solvent system components consisting essentially of
   1. 98–50 parts by weight of a first moiety terminated with from more than 1 to not more than 3 isocyanate groups, liquid at 60° C., having an NCO equivalent weight of at least about 100, containing not more than 5 urethane or urea gram equivalents per 1000 grams of said moiety, and formed by reacting one or more polyisocyanates with one or more diols, triols, diamines or triamines, and
   2. correspondingly 2–50 parts by weight of a second organosilicone moiety which is a silane-modified OH-endblocked predominantly dimethyl-substituted linear polysiloxane, is liquid at 20° C. and has a plurality of active hydrogen groups each chemically bonded to a nitrogen or oxygen atom attached to a $CH_2$ group which is at least 3 carbon atoms distant from the nearest silicon atom, said active hydrogen bearing atoms constituting no more than about 4% by weight of said organosilicone moiety, thereby forming a pourable liquid,
b. coating the pourable liquid in a thin stratum upon a substrate,
c. drying to remove the solvent, and
d. reacting the moieties.

5. The method of claim 4 wherein the components additionally include a crosslinking agent.

6. The method of claim 4 wherein the crosslinking agent is a phenolic resin.

7. The method of claim 4 wherein the organosilicone moiety is the reaction product of a hydroxyl end blocked polydimethylsiloxane and a silane selected from the group consisting of those having the structural formula

wherein

R'' is a monovalent hydrocarbon radical free of aliphatic unsaturation and containing from 1 to 6 carbon atoms, $n$ has a value from 0 to 2, R' is an alkyl radical containing from 1 to 4 carbon atoms, R is a divalent hydrocarbon radical free of aliphatic unsaturation and containing 3 to 4 carbon atoms, the siloxane:silane weight ratio is in the range of about 1:1 to 20:1.

8. The method of claim 7 wherein the silane is $(CH_3O)_3Si(CH_2)_3NH(CH_2)_2NH_2$.

9. The method of claim 7 wherein the silane is

* * * * *